United States Patent
Meret et al.

(10) Patent No.: US 8,812,178 B2
(45) Date of Patent: Aug. 19, 2014

(54) METHOD FOR AUTOMATIC YAW AXIS CONTROL FOR AIRCRAFT WITH MECHANICAL FLIGHT CONTROLS

(71) Applicant: Thales, Neuilly-sur-Seine (FR)

(72) Inventors: Yannick Meret, Valence (FR); Arnaud Bonnafoux, Valence (FR); Christophe Simon, Valence (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/917,487

(22) Filed: Jun. 13, 2013

(65) Prior Publication Data

US 2013/0345907 A1  Dec. 26, 2013

(30) Foreign Application Priority Data

Jun. 15, 2012 (FR) ...................... 12 01716

(51) Int. Cl.
*B64C 13/16* (2006.01)
*B64C 13/18* (2006.01)
*B64C 13/30* (2006.01)

(52) U.S. Cl.
CPC ............ *B64C 13/16* (2013.01); *B64C 13/18* (2013.01); *B64C 13/30* (2013.01)
USPC .......................... 701/3; 244/99.14

(58) Field of Classification Search
None
See application file for complete search history.

(56) References Cited

U.S. PATENT DOCUMENTS

| 3,018,071 | A | | 1/1962 | Horton et al. |
|---|---|---|---|---|
| 4,479,620 | A | * | 10/1984 | Rogers et al. .................. 244/195 |
| 4,992,713 | A | * | 2/1991 | McCollum et al. ............ 318/586 |
| 7,021,587 | B1 | | 4/2006 | Younkin |
| 8,165,729 | B2 | * | 4/2012 | Goupil et al. ...................... 701/3 |
| 2010/0102173 | A1 | * | 4/2010 | Everett et al. .................. 244/175 |
| 2011/0024556 | A1 | * | 2/2011 | Cazals et al. ............... 244/99.12 |
| 2011/0137496 | A1 | * | 6/2011 | Everett et al. ...................... 701/3 |

* cited by examiner

*Primary Examiner* — John R Olszewski
*Assistant Examiner* — David Merlino
(74) *Attorney, Agent, or Firm* — Baker Hostetler LLP

(57) ABSTRACT

A method for automatic yaw axis control in aircraft with mechanical controls, said aircraft including a yaw actuator to control orientation of a yaw control surface and deliver a measured value of the torque on the control surface, a yaw trim actuator driving movement of a yaw trim control surface limiting the force applied by the yaw actuator to orient the yaw control surface, and sensors supplying an estimate of a lateral yaw force, includes calculating a setpoint value for the position of the yaw control surface determined by the estimated lateral force, an estimated torque of the yaw actuator determined by the measured value of the torque of the yaw actuator and a measured position of the yaw control surface, the estimated torque calculated having a lower oscillation dynamic range than the measured torque, and a trim command for activating/deactivating the yaw trim actuator determined by the estimated torque.

8 Claims, 2 Drawing Sheets

METHOD FOR AUTOMATIC YAW AXIS CONTROL FOR AIRCRAFT WITH MECHANICAL FLIGHT CONTROLS

CROSS-REFERENCE TO RELATED APPLICATION

This application claims priority to foreign French patent application No. FR 1201716, filed on Jun. 15, 2012, the disclosure of which is incorporated by reference in its entirety.

FIELD OF THE INVENTION

The present invention lies in the field of automatic aircraft control methods. To be more precise, it relates to an automatic control method for an aircraft with mechanical flight controls adapted to control lateral forces by automatic aircraft yaw axis control.

BACKGROUND

In an aircraft with mechanical flight controls, the pilot manoeuvres the machine by means of controls in the cockpit, such as the yoke or rudder pedals, connected mechanically, typically by cables, to a set of control surfaces adapted to modify the trajectory of the machine. The pilot generally controls yaw by means of control surfaces on the axial vertical tail fin controlled by the rudder pedals. Lateral acceleration, generally denoted $N_y$, generated for example by a change of engine operating conditions on a twin-jet or turbo aircraft or by evolving flight conditions (wind, turbulence, lowering of gear, change of speed, etc.) leads to laterally asymmetrical flight. This induced asymmetry is uncomfortable for passengers and critical for the pilot, in particular in the event of failure of an engine.

With no automatic yaw axis control, the pilot seeks throughout the flight to limit side-slip and must constantly adapt the trim on the roll and yaw axes. A trim control enables reduction or even elimination of the force to be exerted on one of the main attitude controls of the aircraft (pitch via the yoke, roll via the yoke or yaw via the rudder pedals). Most often there is a small control surface at the edge of the main control surface that is actuated in the opposite direction, thereby generating a moment to balance the moment from the main control surface and thus cancel out these forces.

Accordingly, a prior art aircraft with mechanical flight controls includes in the cockpit mechanical controls for yaw axis control, generally two rudder pedals, operating on a system of cables connected to the yaw control surface. It also includes a trim device which can be activated in the cockpit and which acts via a trim actuator on the compensator of the main control surface, also known as the trim tab. In flight, the pilot must be attentive and correct lateral forces by acting on the rudder pedals and the trim control. This imposes a heavy workload, notably on jet or turbo aircraft and when changing engine operating conditions. Moreover, it is difficult to ensure perfect symmetry of the aircraft, resulting in passenger discomfort and excess fuel consumption. In the event of failure of an engine, the pilot must moreover react very quickly to control completely movement about the yaw axis. The risk of asymmetrical stalling is high during these critical flight phases.

SUMMARY OF THE INVENTION

The solution proposed by the present invention consists in an automatic yaw axis control method adapted to control simultaneously the yaw actuator and the yaw trim actuator. An automatic control system employing such a method makes it possible to reduce the pilot workload, to improve safety (by reducing the risks linked to failure of an engine), to improve passenger comfort and to reduce the fuel consumption of the aircraft by enhancing its symmetry.

To this end, the invention provides a method for automatic yaw axis control in an aircraft with mechanical flight controls, implemented in an automatic flight control system of the aircraft, said aircraft including:
  a yaw actuator adapted to control the orientation of a yaw control surface, said yaw actuator being also adapted to deliver a measured value of the torque generated on the yaw control surface,
  a yaw trim actuator adapted to drive movement of a yaw trim control surface for limiting the force to be applied by the yaw actuator to produce the required orientation of the yaw control surface, and
  a set of sensors for supplying an estimate of a lateral yaw force $N_y$ to which the aircraft is subjected in flight.

The method in accordance with the invention includes steps of calculating:
  a setpoint value for the position of the yaw control surface sent to the yaw actuator and determined by means of the estimate of the lateral force $N_y$,
  an estimated torque of the yaw actuator determined by means of the measured value of the torque of the yaw actuator and a measured position of the yaw control surface, the estimated torque calculated in this way having a lower oscillation dynamic range than the measured torque,
  a trim command for activating and deactivating the yaw trim actuator determined by means of the estimated torque.

The invention also relates to an automatic control system for an aircraft with mechanical flight controls including a automatic flight control system in which are implemented code instructions for executing the steps of the automatic control method having the features described hereinabove.

The invention finally relates to an aircraft with mechanical flight controls including an automatic control system having the features described hereinabove.

BRIEF DESCRIPTION OF THE ACCOMPANYING DRAWINGS

The invention will be better understood and other advantages will become apparent on reading the detailed description of embodiments of the invention given by way of example with reference to the following figures.

For clarity, the same elements bear the same reference numbers in the various figures.

DETAILED DESCRIPTION

Figure 1:
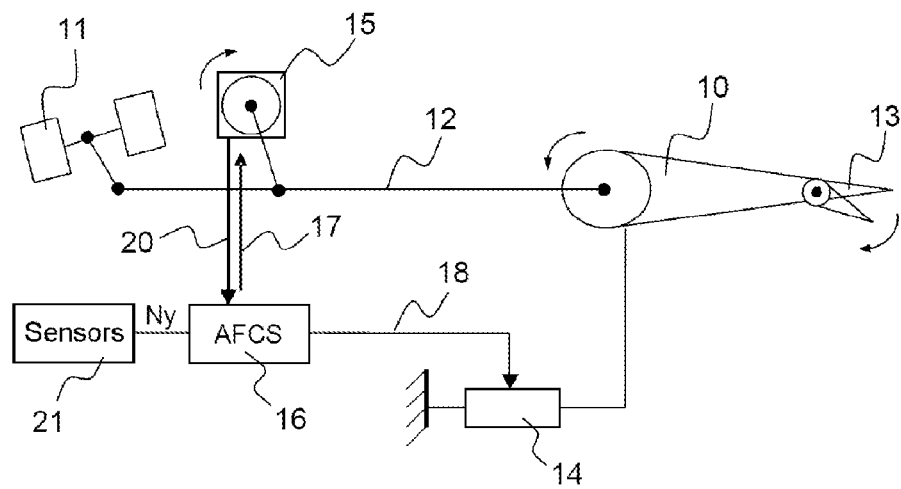
FIG. 1 represents the architecture of an aircraft with mechanical flight controls provided with an automatic yaw axis control system in accordance with the invention.

FIG. 1 represents the architecture of an aircraft with mechanical flight controls provided with an automatic yaw axis control system in accordance with the invention. An aircraft with mechanical flight controls includes a yaw control surface 10, for example on the vertical tail fin at the rear of the aircraft, which by its angular position controls the orientation of the aircraft about the yaw axis. The yaw control surface 10 can be controlled manually by the pilot by means of rudder pedals 11 situated in the cockpit and connected to the yaw control surface 10 by a system of cables 12. To compensate the effort exerted by the yaw control surface 10, a yaw trim control surface 13 also known as a compensator can be oriented by means of a yaw trim actuator 14. This is typically a control surface smaller than and mounted on the main yaw control surface 10. By orienting it, it is possible to generate a torque opposing the torque generated by orienting the main yaw control surface. The yaw trim control surface 13, controlled by the yaw trim actuator 14, thus makes it possible to limit the force loading the yaw control surface 10 and enables more precise yaw axis control.

Note that yaw axis control in an aircraft with mechanical flight controls can be achieved with one or more control surfaces. For example, there are devices comprising two control surfaces on the vertical tail fin or a main control surface on the vertical tail fin assisted by one or more secondary control surfaces on the wings of the aircraft, for example. Hereinafter, references to the yaw control surface 10 must be understood as referring to all control surfaces employed for yaw axis control in the aircraft concerned. Moreover, there is generally only one yaw trim control surface 13, placed on the main control surface on the vertical tail fin. However, the invention applies in the same manner in the case of an aircraft provided with a plurality of yaw trim control surfaces controlled by the yaw trim actuator 14.

The automatic control system of the invention includes a yaw actuator 15, also known as a yaw damper actuator unit (YDAU), that can take over from the pilot and operate on the yaw control surface 10 via the system of cables 12. The yaw actuator 15 converts a setpoint value 17 for the position of the yaw control surface 10 into a mechanical force applied to the yaw control surface 10. A computer 16 in which the automatic yaw axis control method is implemented determines a position setpoint value 17 sent to the yaw actuator 15 and a trim command 18 sent to the yaw trim actuator 14. The trim command 18 has two states, a first of which activates the yaw trim actuator 14 to modify the orientation of the yaw trim control surface 13 to reduce the torque generated on the yaw control surface 10. A second state deactivates the yaw trim actuator 14, the yaw trim control surface 13 retaining the same orientation.

The computer 16 is also referred to as the automatic flight control system (AFCS).

The yaw actuator 15 includes means for measuring its torque. This torque reflects the torque generated by the flow of air over the yaw control surface 10; a measured value 20 of this torque generated on the yaw control surface can thus be determined by the yaw actuator torque measuring means 15. This measured torque 20 of the yaw actuator 15 is sent to the automatic flight control system 16. Finally, the aircraft also includes a set of sensors 21 for supplying an estimated lateral yaw force $N_y$ to which the aircraft is subjected in flight. In a preferred embodiment of the invention, this estimate is obtained by means of a set of accelerometer sensors.

Accordingly, the invention relates to a method for automatic yaw axis control in an aircraft with mechanical flight controls implemented in an automatic flight control system 16 of the aircraft, said aircraft including:
- a yaw actuator 15 adapted to control the orientation of a yaw control surface 10, said yaw actuator 15 being also adapted to deliver a measured value 20 of the torque generated on the yaw control surface 10,
- a yaw trim actuator 14 adapted to drive movement of a yaw trim control surface 13 for limiting the force to be supplied by the yaw actuator 15 to achieve the required orientation of the yaw control surface 10, and
- a set of sensors 21 adapted to supply an estimate of a lateral yaw force $N_y$ to which the aircraft is subjected in flight.

The method in accordance with the invention includes steps of calculating:
- a setpoint value 17 for the position of the yaw control surface 10 sent to the yaw actuator 15 and determined by means of the estimate of the lateral force $N_y$,
- a trim command 18 for activating and deactivating the yaw trim actuator 14 determined by means of the measured torque 20 of the yaw actuator 15.

Figure 2:
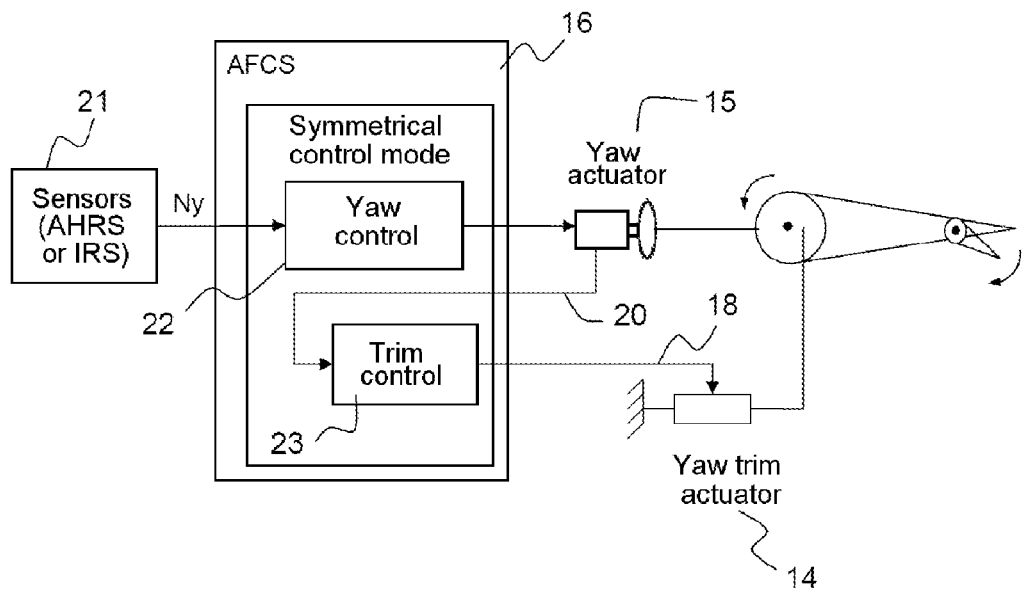
FIG. 2 represents the simplified functional architecture and the inter-relationships of an automatic yaw axis control system in accordance with the invention.

FIG. 2 represents the simplified functional architecture and the inter-relationships of an automatic yaw axis control system in accordance with the invention. The automatic control system includes an automatic flight control system 16 in which are implemented code instructions for executing the steps of the automatic control method in accordance with the invention. The input data needed for the method notably include an estimate of a lateral yaw force $N_y$ to which the aircraft is subjected in flight and a measured value 20 of the torque of the yaw actuator 15. For estimating the lateral force $N_y$ there are notably known attitude heading reference sensors (AHRS) and inertial reference sensors (IRS). A yaw actuator 15 includes for example a servomotor provided with means for measuring the torque generated on the latter.

The output data of the automatic flight control system 16 include a setpoint value 17 for the position of the yaw control surface 10 sent to the yaw actuator 15 and a trim command 18 sent to the yaw trim actuator 14.

The automatic control system labelled "Symmetrical control mode" in the figure includes two modules:
- a first module 22 for yaw control, and
- a second module 23 for yaw trim control.

In accordance with the invention, the function of the first module 22 is to cancel out the lateral forces $N_y$ determined by the set of sensors 21 by acting on the yaw actuator 15. This is referred to as a law for maintaining $N_y=0$. The function of the second module 23 is to reduce the torque on the yaw actuator 15 by controlling the yaw trim actuator 14 as a function of the measured torque 20. This is referred to as a yaw axis autotrim law.

Figure 3:
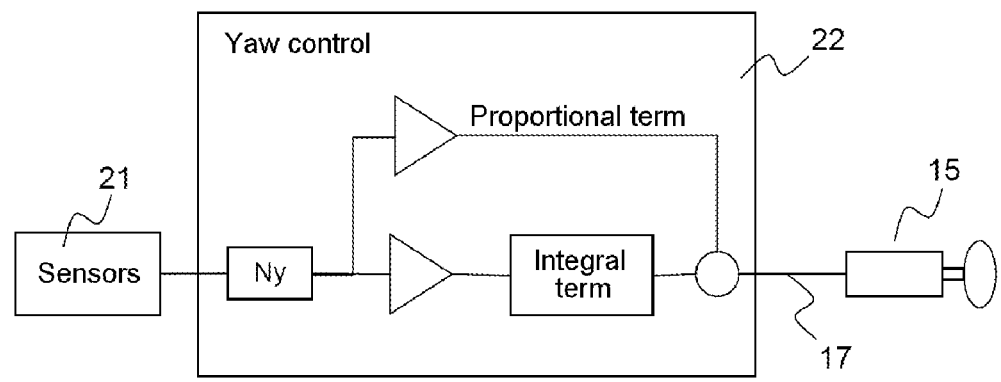
FIG. 3 illustrates the calculation steps of a yaw actuator control method of one embodiment of the invention.

FIG. 3 illustrates the calculation steps of a yaw actuator control method in accordance with one embodiment of the invention. The yaw actuator 15 is controlled by the module 22 implemented in the automatic flight control system 16 by means of an estimate of the lateral force $N_y$ as described above with reference to FIGS. 1 and 2.

With the aim of ensuring symmetrical flight of the aircraft, a position setpoint value 17 sent to the yaw actuator 15 is determined by means of a device for controlling the lateral force $N_y$, for example a device of the proportional integral type. In other words, the setpoint value 17 for the position of the yaw actuator 15 is determined by means of a control loop operating on the lateral force $N_y$ employing at least a proportional term and an integral term and having for its setpoint value a zero lateral force.

This control example given by way of example is in no way limiting on the method in accordance with the invention. Other control devices may be envisaged, such as for example a non-linear inverse H-infinity type device.

Figure 4:
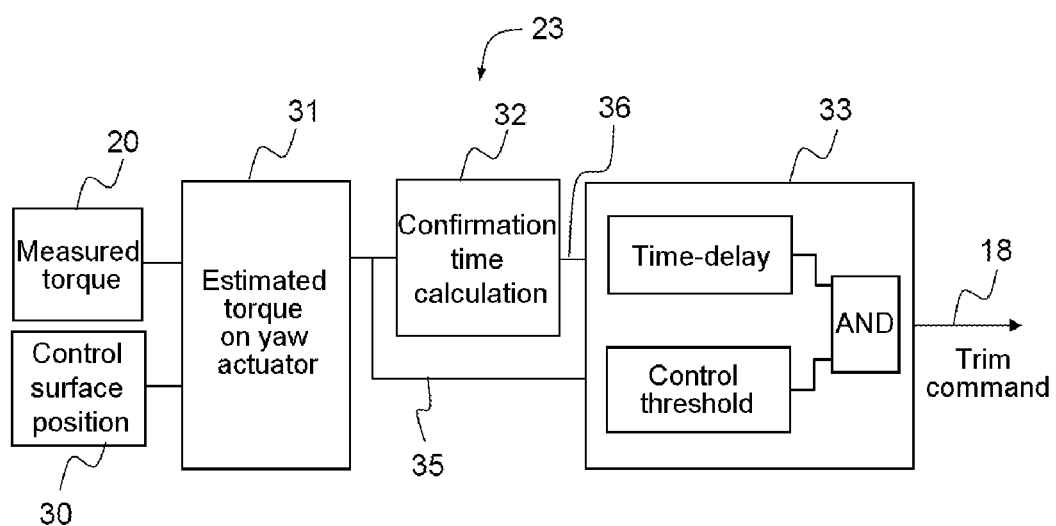
FIG. 4 illustrates the calculation steps of a yaw trim actuator control method of one embodiment of the invention.

FIG. 4 illustrates the calculation steps of a yaw trim actuator control method in accordance with one embodiment of the invention. The yaw trim actuator 14 is controlled by the module 23 implemented in the automatic flight control system 16 by means of a measured value 20 of the torque of the yaw actuator 15 as described above with reference to FIGS. 1 and 2. The calculation also uses a measured position 30 or copied position of the yaw control surface 10.

The trim command 18 has a first state for activating the yaw trim actuator 14, which modifies the orientation of the yaw trim control surface 13 to reduce the torque generated on the yaw control surface 10, and a second state for deactivating the yaw trim actuator 14, the yaw trim control surface 13 then retaining the same orientation.

To limit oscillations and to damp yaw axis control by the yaw trim actuator 14, the method includes a first step 31 of calculating an estimated torque 35 from the measured torque 20, the latter generally being a signal with a very high level of noise. Various filter techniques may be employed in this calculation step 31.

Accordingly, calculation of the trim command 18 advantageously includes a first step 31 of calculating an estimated torque 35 of the yaw actuator 15 determined by means of the measured torque 20 of the yaw actuator 15 and a measured position 30 of the yaw control surface 10; the estimated torque 35 calculated in this way has a lower oscillation dynamic range than the measured torque 20.

In a second calculation step 32, a confirmation time 36 is determined as a function of the estimated torque 35 previously calculated, for example by linear interpolation on a predetermined monodimensional map. Typically, the higher the estimated torque 35, the shorter the confirmation time 36 before the automatic flight control system sends a trim command 18.

Accordingly, the calculation of the trim command 18 advantageously includes a second step 32 of calculating a confirmation time 36 for activating the yaw trim actuator 14 determined by means of a decreasing function dependent on the estimated torque 35.

In a preferred embodiment of the invention, a third calculation step 33 uses a timer that is triggered when the estimated torque 35 is above a predetermined threshold S1, the timer being reset to zero as soon as this condition is no longer satisfied. The trim command activates the yaw trim actuator 14 if the timer determines a time greater than the confirmation time 36.

The calculation of the trim command 18 advantageously includes a third calculation step 33 consisting in:
triggering a timer if the estimated torque 35 is above a predetermined threshold S1, the timer being reset to zero as soon as this condition is no longer satisfied,
activating the yaw trim actuator 14 if the timer determines a time greater than the confirmation time 36 previously determined.

In this embodiment, a fourth calculation step consists in deactivating the yaw trim actuator 14 if the estimated torque 35 is below a predetermined threshold S2.

The calculation of the trim command 18 advantageously includes a fourth calculation step 34 consisting in triggering deactivation of the yaw trim actuator 14 if the estimated torque 35 is below a predetermined threshold S2.

It is possible to use other ways of calculating the trim command 18 for activating and deactivating the yaw trim actuator. The purpose of this function is to delay any command that might be corrected "naturally" by the yaw control 22 and to make it possible to prevent untimely application of commands to the yaw trim actuator and continually loading it. Likewise, a low torque will not be countered by the automatic flight control system, negligible feedback being sensed by the crew in this case. In an alternative embodiment, the reciprocal of the confirmation time 36 is integrated continuously; the trim command 18 activates the yaw trim actuator 14 as soon as the value of the integral is above a first predetermined threshold or the estimated torque 35 is above a second predetermined threshold. In a third embodiment, a plurality of confirmation devices is provided each employing a different torque detection threshold with an associated confirmation time. The higher the torque detection threshold the shorter the confirmation time. The trim command 18 activates the yaw trim actuator 14 as soon as one of the confirmation units is activated or the estimated torque 35 is above a predetermined threshold.

The method in accordance with the invention advantageously further includes a step of displaying a plurality of calculation variables of the method representative of the automatic control method and including at least the setpoint value 17 for the position of the yaw actuator and the measured position 30 of the yaw control surface 10.

Employing the method of the invention is particularly advantageous because it solves the problems of asymmetrical flight and pilot workload because, through automatic control, it enables cancellation of lateral forces without intervention of the pilot whatever the flight configuration or engine thrust. It renders the transitory operation regime linked to failure of an engine relatively transparent for the pilot and passengers.

The invention also relates to an automatic control system for an aircraft with mechanical flight controls including an automatic flight control system in which are executed code instructions for executing the steps of the automatic control method having the features described hereinabove.

The invention further relates to an aircraft with mechanical flight controls including an automatic control system having the features described hereinabove.

In practice, the invention can be applied by adding an automatic yaw axis control system in parallel with the mechanical flight controls or by modifying the existing automatic flight control system. It must also be coupled to the existing manual yaw axis trim mechanism. The integration of the invention into an aircraft with manual flight controls enables the addition to yaw axis control of a higher mode of cancellation of lateral acceleration, coupled to an automatic yaw axis trim function. This higher mode is activated upon engaging a stabilisation device (engaging the yaw damper) with the aim of cancelling out the lateral acceleration. Automatic yaw axis trim activated simultaneously with the higher mode of lateral acceleration cancellation makes it possible to render yaw axis control completely automatic, in the manner of electrical flight control. The invention finally enables display of the status of the function, for example on the primary flight display.

The invention claimed is:

1. A method for automatic yaw axis control in an aircraft with mechanical flight controls, implemented in an automatic flight control system of the aircraft, said aircraft including a yaw actuator adapted to control the orientation of a yaw control surface, said yaw actuator being also adapted to deliver a measured value of the torque generated on the yaw control surface, a yaw trim actuator adapted to drive movement of a yaw trim control surface for limiting the force to be applied by the yaw actuator to produce the required orientation of the yaw control surface, and a set of sensors for supplying an estimate of a lateral yaw force to which the aircraft is subjected in flight, said method comprising steps of calculating:

a setpoint value for the position of the yaw control surface sent to the yaw actuator and determined by means of the estimate of the lateral force, an estimated torque of the yaw actuator determined by means of the measured value of the torque of the yaw actuator and a measured position of the yaw control surface, the estimated torque calculated in this way having a lower oscillation dynamic range than the measured torque, and a trim command for activating and deactivating the yaw trim actuator determined by means of the estimated torque.

2. The automatic control method according to claim 1, wherein the setpoint value for the position of the yaw actuator is determined by means of a control loop for the lateral force employing at least a proportional term and an integral term and having for its setpoint value a zero lateral force.

3. The method according to claim 1, wherein the calculation of the trim command includes a second step of calculating a confirmation time for activating the yaw trim actuator determined by means of a decreasing function dependent on the estimated torque.

4. The method according to claim 3, wherein the calculation of the trim command includes a third calculation step including:

triggering a timer if the estimated torque is above a predetermined threshold, the timer being reset to zero as soon as this condition is no longer satisfied, activating the yaw trim actuator if the timer determines a time greater than the confirmation time previously determined.

5. The method according to claim 4, wherein the calculation of the trim command includes a fourth calculation step consisting in triggering deactivation of the yaw trim actuator if the estimated torque is below a predetermined threshold.

6. The method according to claim 1, including a step of displaying a plurality of calculation variables of the method representative of the automatic control method and including at least the setpoint value for the position of the yaw actuator and a measured position of the yaw control surface.

7. An automatic control system for an aircraft with mechanical flight controls including an automatic flight control system in which are implemented code instructions configured to execute the steps of the automatic control method according to claim 1.

8. An aircraft with mechanical flight controls including an automatic control system according to claim 7.

* * * * *